US009256587B2

(12) United States Patent
Haggart et al.

(10) Patent No.: US 9,256,587 B2
(45) Date of Patent: Feb. 9, 2016

(54) EDITOR FOR WEBSITE AND WEBSITE MENU

(71) Applicant: APHOTOFOLIO.COM, Durango, CO (US)

(72) Inventors: Robert E. Haggart, Durango, CO (US); Charlton K. Akins, Bend, OR (US)

(73) Assignee: APHOTOFOLIO.COM, Durango, CO (US)

(*) Notice: Subject to any disclaimer, the term of this patent is extended or adjusted under 35 U.S.C. 154(b) by 418 days.

(21) Appl. No.: 13/791,031

(22) Filed: Mar. 8, 2013

(65) Prior Publication Data
US 2013/0326345 A1 Dec. 5, 2013

Related U.S. Application Data

(60) Provisional application No. 61/655,403, filed on Jun. 4, 2012.

(51) Int. Cl.
G06F 17/24 (2006.01)
(52) U.S. Cl.
CPC .................... G06F 17/24 (2013.01)
(58) Field of Classification Search
CPC .................................................... G06F 17/24
USPC ........................................................ 715/255
See application file for complete search history.

(56) References Cited

U.S. PATENT DOCUMENTS 5,911,145 A * 6/1999 Arora et al. .................... 715/207
6,583,799 B1 * 6/2003 Manolis ............ G06F 17/30244
707/E17.019
2003/0023632 A1 * 1/2003 Ries et al. ...................... 707/513
2004/0148576 A1 * 7/2004 Matveyenko et al. ........ 715/530
2004/0210845 A1 * 10/2004 Paul et al. ....................... 715/731
2005/0210413 A1 * 9/2005 Quek .................... G03D 15/005
715/838
2006/0181736 A1 * 8/2006 Quek .................... G03D 15/005
358/1.18
2006/0212790 A1 * 9/2006 Perantatos et al. .......... 715/501.1
2006/0248442 A1 * 11/2006 Rosenstein et al. ......... 715/501.1
2007/0162845 A1 * 7/2007 Cave et al. ..................... 715/530
2007/0186178 A1 * 8/2007 Schiller ................. G06F 3/0486
715/769
2008/0120538 A1 * 5/2008 Kurz et al. ..................... 715/255
2008/0209336 A1 * 8/2008 Brown et al. .................. 715/744
2010/0037168 A1 * 2/2010 Thayne et al. ................ 715/769
2011/0022946 A1 * 1/2011 Gupta et al. ................... 715/234
2013/0071037 A1 * 3/2013 Isaacs ................. G06Q 30/0643
382/232
2013/0086496 A1 * 4/2013 Baram et al. .................. 715/762

OTHER PUBLICATIONS

Adobe Creative Team, Adobe Photoshop Lightroom 4 Classroom in a Book, Adobe Press, 2012, p. 306-308.*

* cited by examiner

Primary Examiner — Frank D Mills
(74) Attorney, Agent, or Firm — Stoel Rives LLP

(57) ABSTRACT

Methods, systems, and devices for editing websites are disclosed herein. A website editor for editing a website includes an editor display component, a website modification component, and a website display component. The editor display component is configured to display an editor interface for receiving user input for editing a website. The editor interface is displayed within a browser substantially simultaneously with the website. The website modification component is configured to update website data corresponding to the website based on the user input received through the editor interface. The website display component is configured to automatically update display of the website based on the updated website data. The display of the website is updated in real-time in response to receiving the user input.

43 Claims, 17 Drawing Sheets

EDITOR FOR WEBSITE AND WEBSITE MENU

RELATED APPLICATION

This application claims the benefit under 35 U.S.C. §119(e) of U.S. Provisional Patent Application No. 61/655,403 entitled "Systems and Methods for Designing Mixed-Media Portfolio Websites" and filed on Jun. 4, 2012, which is hereby incorporated herein by reference in its entirety.

TECHNICAL FIELD

The present disclosure relates to a website editor for editing websites.

DETAILED DESCRIPTION OF PREFERRED EMBODIMENTS

Websites often perform an important role for businesses in communicating with clients, advertising, and providing information about available services and products. Often, it is useful for photographers or other artists to place some of their work on an online website to illustrate their skill, attract more work, or provide pictures to a client. However, artists or others business who are good at providing high quality goods and services often do not have the skill to produce attractive or content rich websites. The programming and web hosting skills can be difficult to obtain and the costs of hiring a programmer can also be prohibitive. Particularly in the case of photographers or other artists operating as a small business, the costs of an attractive website that presents their work well can be difficult to program or expensive to contract out.

Figure 1:
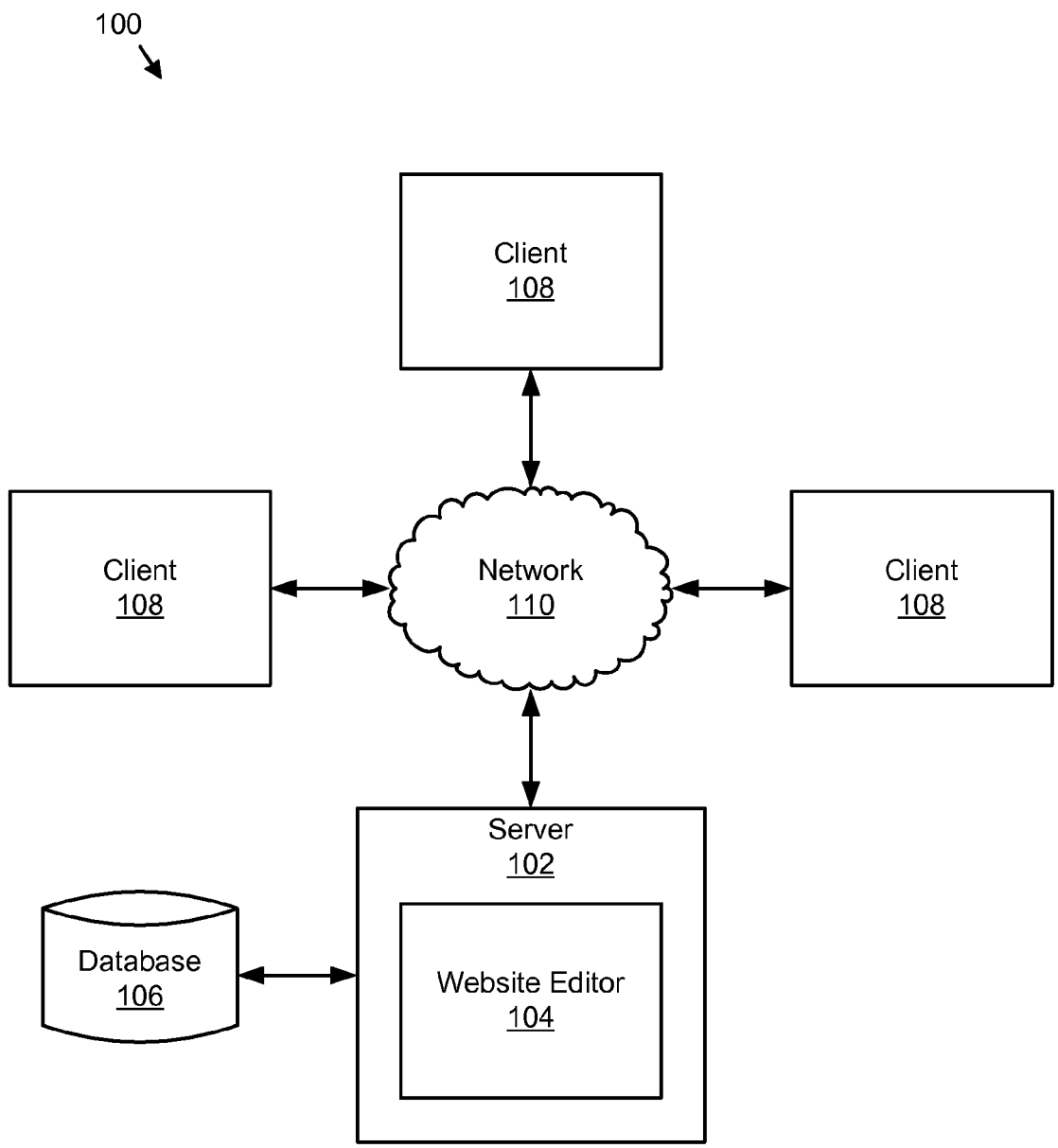
FIG. 1 is a schematic diagram illustrating a system for editing or designing a website consistent with embodiments disclosed herein.

FIG. 1 is a schematic diagram of a system 100 for designing or editing a website. The system includes a server 102 that includes a website editor 104, a database 106, and one or more clients 108. The server 102 and the clients 108 are in communication via a network 110. The network 110 may include any type of computer network or communication network.

The server 102 may include one or more computing devices for receiving and responding to requests from one or more clients 108. The server 102 may receive and respond to requests to access one or more websites. For example, the server 102 may provide website data corresponding to a website to a client 108 in response to a client attempting to navigate to the website. The server 102 may access a database 106 that includes website data for one or more websites to provide data to the clients 108 as needed or otherwise requested.

The server 102 may also provide website editing functionality that may be accessed via the clients 108. For example, the server 102 includes a website editor 104 that provides an interface for editing a website. In one embodiment, the server 102 serves a portion or all of the website editor 104 to a client 108, which then allows a client to edit a website. For example, the server 102 may provide code executable within a browser of a client 108 that provides an editor interface and/or other functionality to edit a website within a browser of the client 108. Although the website editor 104 is shown as part of the server 102, the website editor 104 may be located locally on a client 108, in the database 106, or elsewhere.

The clients 108 may include any type of device, browser, or other component capable of accessing content or websites over a network. For example, the clients 108 may include web capable browsers, applications, or devices. Example client 108 devices may include desktop computers, laptop computers, tablet computers, mobile phones such as smart phones, or the like.

Figure 2:
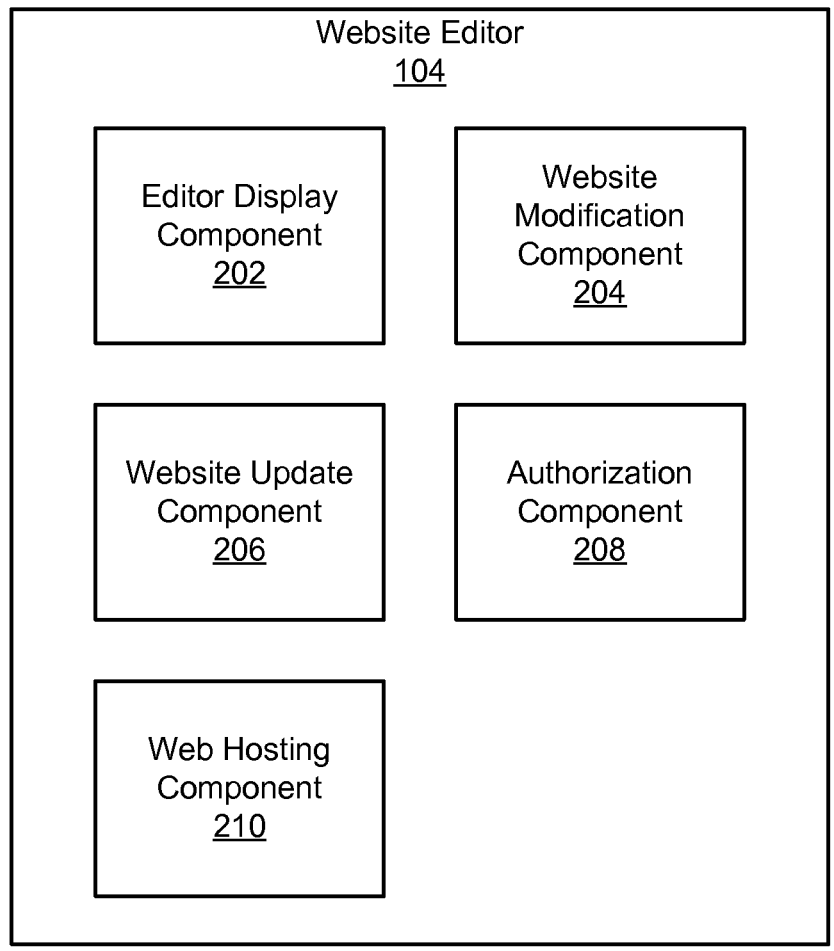
FIG. 2 is a schematic block diagram of components of a website editor consistent with embodiments disclosed herein.

FIG. 2 is a schematic block diagram of example logical components of a website editor 104. The website editor 104 includes an editor display component 202, a website modification component 204, a website display component 206, an authorization component 208, and a web hosting component 210. Not all components may be included in all embodiments. For example, various components may include any one or any combination of two or more of the components 202, 204, 206, 208, and 210 illustrated in FIG. 2.

Each of the components 202, 204, 206, 208, and 210 may be embodied in hardware and/or software. In one embodiment, the website editor 104 comprises software code that may be served from a server 102 to a client 108 for execution at the client 108. At least a portion of the code may include code that is executable within a browser. For example, the served code may include Java®, JavaScript® or other code that can be interpreted and/or executed within the browser. One or more of the editor display component 202, website modification component 204, website display component 206, authorization component 208, and web hosting component 210 may be received by a client 108 from a server 102. In another embodiment, at least a portion of the website editor 104 comprises code executed at a server 102 to allow a remote client 108 to edit a website.

The editor display component 202 displays an editor interface configured to receive user input for editing a website. The editor interface may include a number of graphical elements and/or input fields to allow a user to edit a website. Example attributes or features of a website that may be edited using the editor interface include a website menu, content on a webpage, a title, a navigation bar, border sizes, and any other feature of a webpage. For example, the editor display component may display an editor interface that includes a menu design interface that allows a user to modify a website menu. As another example, the editor display component may display an editor interface that includes a media library interface to modify what content is available on the website.

In one embodiment, a website editor 104 may be able to receive user input through the editor interface entered by a user. The editor interface may include a panel with one or more graphical elements for modifying website data for the website. Specific examples of editor interfaces and the various attributes, features, and functionally of a website editor 104 and website that may be edited is discussed below in relation to FIGS. 3, 4, 5, 6, 7, 8, 9, 10, 11, 12, 13, 14, 15, and 16.

In one embodiment, the editor display component 202 displays the editor interface in a browser of a client 108. For example, the client 108 may be running a browser 108 to access or edit a website and the editor display component 202 may display the editor interface within the browser. The editor interface may be served to the client 108 and displayed within a web browser as if the editor interface were a part of a website or webpage that is currently being viewed at the client 108.

In one embodiment, the editor interface is displayed at least partially overlapping the website. For example, the editor interface may include one or more graphical elements that appear to reside on top of the website. The editor interface may be shown simultaneously with the website such that changes made within the editor interface may be viewed on the webpage. In one embodiment, the editor interface and the website to be edited using the editor interface are displayed simultaneously within a same window, tab, and/or browser page of the browser.

The editor interface may include one or more graphical panels that are displayed on top of or in front of the website. For example, the graphical panels may be displayed similar to windows within numerous desktop operating systems. Similarly, a user may be able to freely reposition a graphical panel or other element of the editor interface by dragging and dropping the element in relation to the displayed website using an input device.

In one embodiment, the editor interface may be collapsed or minimized to reduce an amount of the website that is overlapped by the editor interface. For example, the editor interface may include an editor control object which may be selected to selectively expand or collapse one or more graphical panels of the editor interface. In one embodiment, the editor interface allows a user to selectively expand different portions of the editor interface. For example, the user may be able to expand a menu design interface while keeping a media library interface collapsed. Selective expansion of the editor interface may allow a user to better see the website or see a larger portion of the website.

The website modification component 204 updates website data corresponding to the website based on the user input received through the editor interface. The website modification component 204 may update the website data by directly modifying a version of website data that defines display and content for the website. For example, the website modification component 204 may translate user input into updated website data, such as into hypertext markup language (HTML), extensible HTML (XHTML), Java®, JavaScript®, or any other language or code. The updated website data may then be included into the website data for the website. In one embodiment, a selection of a specific option in the editor interface may cause the website modification component 204 to insert, remove, or modify preexisting available code. For example, code corresponding to different options may be selectively included in the website based on what options or entries a user makes within the editor interface.

The website modification component 204 may modify a temporary version of website data. This may include modifying a local copy at a client 108. For example, a client may receive website data from a server 102 and use the website data as a local copy. In another embodiment, modifying a temporary version of website data may include modifying a temporary version of website data at a server 102 or other website data host. For example, when a user begins editing of a website a server 102 or database 106 may create a second version of the website data which is then updated by the website modification component 204. When user input is provided through the editor interface, the website modification component 204 may initially only update the temporary version of website data until a user indicates that the user would like to keep the changes. Later, the website modification component 204 may push the changes to a more permanent version of website data stored in a database 106 or on a server. In other embodiments, the website modification component 204 may modify a live version of the website data on a website data host such as any other users who try to access the website will see the changes.

In one embodiment, the website modification component 204 may modify website data by providing messages indicating what user input was received or provide messages to a server 102 or database 106 that indicate what portions of website data should be modified and how. For example, the website modification component 204 may not directly modify the website data but may provide messaging to a server 102, database 106, or other device or system that interprets the message and updates website data accordingly.

The website modification component 204 may modify the website data in real-time. For example, each time a user provides input (such as by entering text, modifying a slider, selecting an item from a list, or selecting an option) the website modification component 204 modifies the website data. The website modification component 204 may provide a request or instruction in response to each time a user provides input such that for every modification or input the user provides, a message or instruction to update the website data is generated. In one embodiment, the website modification component 204 may periodically update the website data based on all the user input provided by the user within a defined time period. According to one embodiment, the time period is selected to provide frequent enough updates to allow the corresponding changes to the website to appear to happen immediately or almost immediately to a human user.

The website display component 206 updates display of the website based on updated website data. For example, the website display component 206 may automatically update display of the website based on updated website data modified by the website modification component 204. The website display component 206 updates display of the website on the client 108 or other device which a user is using to edit the website. For example, the website display component 206 updates the display of the website, such that the version of the website displayed in a browser is automatically and quickly updated to illustrate any changes resulting from input provided by the user in the editor interface.

In one embodiment, the website display component 206 updates a website that is shown "behind" or as part of a same browser page in a browser of a client 108. For example, input provided into the editor interface may result in a change to the display of the website "behind" the editor interface while a part of the website is covered by the editor interface. A user may be able to determine the effect of the input and may be able to provide further or different input to obtain a desired display of the website.

Similarly to the website modification component 208, the website display component 206 may update display of the website in real-time in response to a input from the user. As used herein the term real-time is given to mean that updating of the display of the website data will be performed within a defined time period or, alternatively, that the updating of the display of the website data is performed quickly enough to appear almost immediate to a human user. Thus, the user may be able to get real-time feedback to each piece of input and determine that multiple pieces of input result in a desirable website.

The authorization component 210 authorizes a user on a client 108. In one embodiment, the authorization component 210 authorizes a user by receiving credentials from the client 108 to determine that the client 108 and/or user are authorized to edit a website. For example, the authorization component 210 may receive a user name and password or other authentication information entered by a user at the client 108 to determine whether the user is authorized to edit a website.

According to one embodiment, the authorization component 210 limits access to the website editor 104 or editor interface prior to authorizing a user. For example, the authorization component 210 may limit the editor display component 202 from displaying the editor interface prior to authorizing the user. In other words, the editor display component 202 may display the editor interface in response to authorization of the user by the authorization component 210.

The web hosting component 212 controls hosting and serving of the website editor 104 and/or the components 202, 204, 206, and 208 of the website editor 104. In one embodiment, the web hosting component 212 provides at least a portion of one or more of the other components 202, 204, 206, and 208 to a client 108. For example, the web hosting component 212 may provide code or instructions of the editor display component 202 to client 108 for execution so that a user may be able to see the editor interface on the client 108. Similarly, code or other data corresponding to any of the other components 204, 206, and 208 may be provided to the client.

The website editor 104 may allow for significant utility in editing or designing a website. For example, real-time changes of the website in relation to user input may allow those not skilled in website design or programming to easily and quickly create a desired website layout and appearance. For example, because changes to the website are reflected in real-time in relation to user input, the user can make a change and almost immediately see the changes that result. This can allow the user to quickly learn what settings do what and also whether a specific change is desired.

The web hosting of the website editor 104 may allow for website design or modification from almost anywhere. For example, a user may be able to use a web browser on any type of client 108, such as a computer, phone, tablet, or other device, to make needed changes or even perform an initial set up of the website. Special software or other software local to a client 108 may not need to be installed because the website editor 104 can be served and run within a browser. Also, issues or problems with the website may be quickly resolved even if a site owner or designer is at a remote location, such as on a trip or other location where access to the user's normal computer or equipment is not possible.

Turning now to FIGS. 3, 4, 5, 6, 7, 8, 9, 10, 11, 12, 13, 14, 15, and 16, embodiments of an editor interface for editing a media portfolio website is shown. Example operation of website editor 104 for editing a photography website will be described in relation to these figures. FIGS. 3, 4, 5, 6, 7, 8, 9, 10, 11, 12, 13, 14, 15, and 16 are example screenshots of a website 300 and portion of an editor interface displayed within a browser. In one embodiment, when a client access the website 300, it may be displayed without an editor interface until a user provides authorization details to enable display of the editor interface. The website 300 includes a logo 302, a website menu 304, a navigation bar (navbar) 306, and a current page 308. The website menu 304 includes a number of menu items which may be viewed and selected to find or view different portions of the website 300 or view linked websites. For example, the website menu 304 includes a Facebook® symbol which may be a link to a Facebook® page of the site owner.

The navigation bar 306 includes a variety of options to change how the current page 308 is displayed or access other information about the website. A fullscreen option may allow a user to display the website 300 using a full screen of a display, such as a computer display. A caption option may allow a user to view a caption or description for content currently being displayed. For example, a caption for a current photo that is displayed may be selectively be viewed by selecting the caption option. An email option may allow a user to send site content in an email to an email address. A thumbnail option may allow a user to view multiple media content items on the website in a thumbnail view. For example, the thumbnail option may allow a user to view the thumbnails for media content items that are part of a media gallery. A previous option and next option may allow a user to move from one media content item to the next and a location display (displayed as "4 of 18" in the current view) illustrates the location of the content in relation to other content on the website or on a web page.

Figure 3:
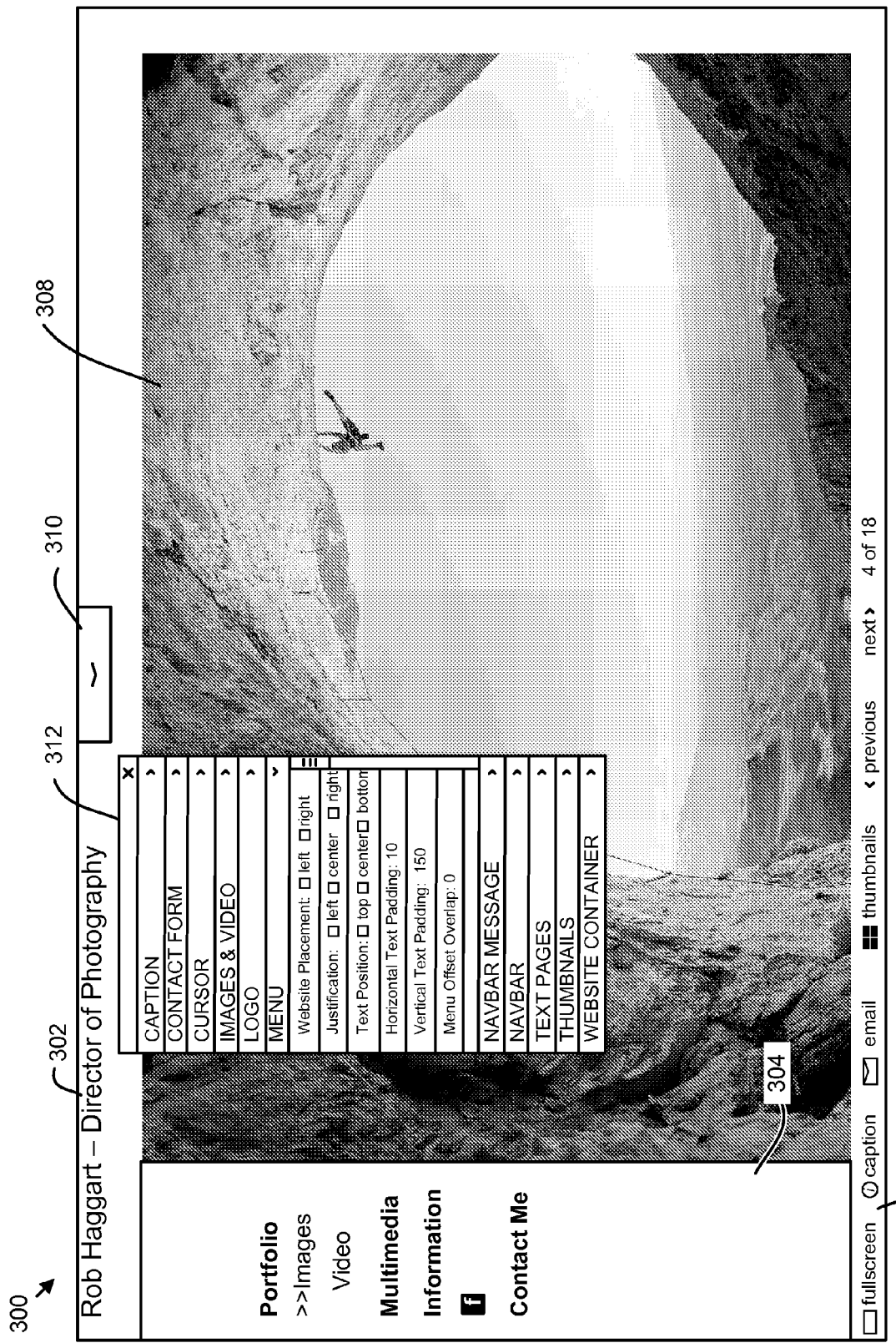
FIGS. 3, 4, 5, 6, and 7 graphically represent screenshots illustrating a website and a website design panel of an editor interface consistent with embodiments disclosed herein.
Figure 4:
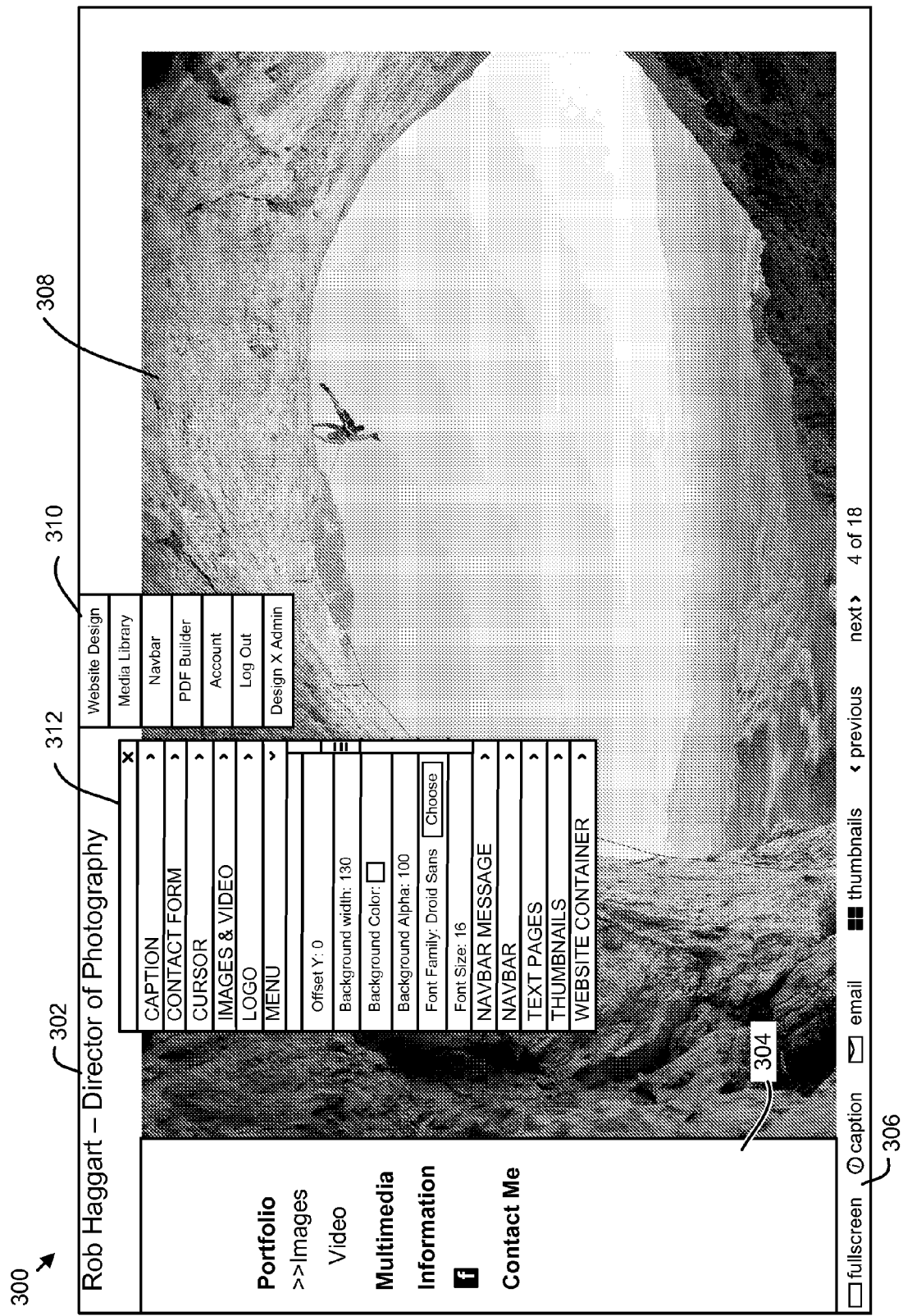

The editor interface includes an editor control object 310. The editor control object 310 may be used to selectively display and/or hide portions of the editor interface. According to one embodiment, selection of the editor control object 310 by a user causes the editor control object 310 to expand. FIG. 3 illustrates the editor control object 310 in a collapsed or minimized position and FIG. 4 illustrates the editor control object 310 in an expanded position to list panels which may be viewed by the user. FIG. 4 shows that a user may be able to open a Website Design panel, a Media Library panel, a Navbar panel, a PDF builder panel, and an Account panel. The user may also be able to logout of the website editor to end editing of a website.

A website design panel may allow a user to set a variety of website design settings for the website 300. The media library panel may allow a user to add media content to a website, configure display of menu items in a website menu, and provide other input to design a website and include media content. The navbar panel may allow a user to control what items and/or options are shown within the navigation bar 306. The PDF builder panel may allow a user to provide a variety of settings to create PDF versions of the website 300 or content found within the website 300. The account panel may allow a user to update account setting, control a version of a website editor is used, or the like.

FIGS. 3, 4, 5, 6, and 7 illustrate one embodiment of a website design panel 312. The website design panel 312 includes a number of expandable sections for designing the website. In this example, the website design panel 312 includes a caption section, a contact form section, a cursor section, an images & video section, a logo section, a menu section, a navbar message section, a navbar section, a text pages section, a thumbnails section, and a website container section.

The caption section may include settings for displaying a caption for content displayed on the website, such as a caption for an image. The contact form section may provide contact information and/or forms for contacting a website owner. The cursor section may control how a cursor, if any, is displayed on the website. The images & video section may include settings allowing a user to control how videos and images are displayed or rendered. The logo section may control display of the logo 302 as text, an image, a symbol, or with other variations. The menu section allows a user to control how a menu is displayed. The navbar message section controls how a navigation bar 306 message, if present, is displayed. For example, the navigation bar 306 may include a message that includes company information, copyright notices, or the like. The navbar section controls display settings for the navigation bar 306. The text pages section controls how pages of text are displayed. The thumbnails section controls how a thumbnail view of a gallery is displayed. The website container controls how borders around content or a webpage of the website is displayed.

The website design panel 312 is illustrated with an expanded menu section in FIGS. 3, 4, 5, 6, and 7. The menu section includes a number of fields which may be used to enter or select a setting for the website menu 304 or menu items in the website menu 304. The menu items may include text or icons that act as one or more of a link to a webpage of the website, an external link, or a link for performing an operation. Following is a brief description of each setting in the menu section.

In FIG. 3, a "website placement" setting controls a position of the website menu 304 on the website 300. A "justification setting" changes a justification of menu items. A "text position" setting anchors the menu items on the top, center or bottom of the website menu 304. A "horizontal text padding" setting applies horizontal padding (spacing) to the menu items in the website menu 304. A "vertical text padding" setting applies vertical padding (spacing) to the menu items in the website menu 304. A "menu offset overlap" setting applies an offset to the website menu forcing the content on the current page 308 away or underneath the website menu 304.

In FIG. 4, an "offset Y" setting positions the entire website menu 304 along the y axis (up or down). A "background width" setting sets the width of the website menu 304. A "background color" setting sets the background color of the website menu 304. A "background alpha" setting sets the background alpha (transparency) of the background color of the website menu 304. A "font family" setting sets the font or font family for text menu items in the website menu 304. A "font size" setting sets the font size for text menu items in the website menu 304.

Figure 5:
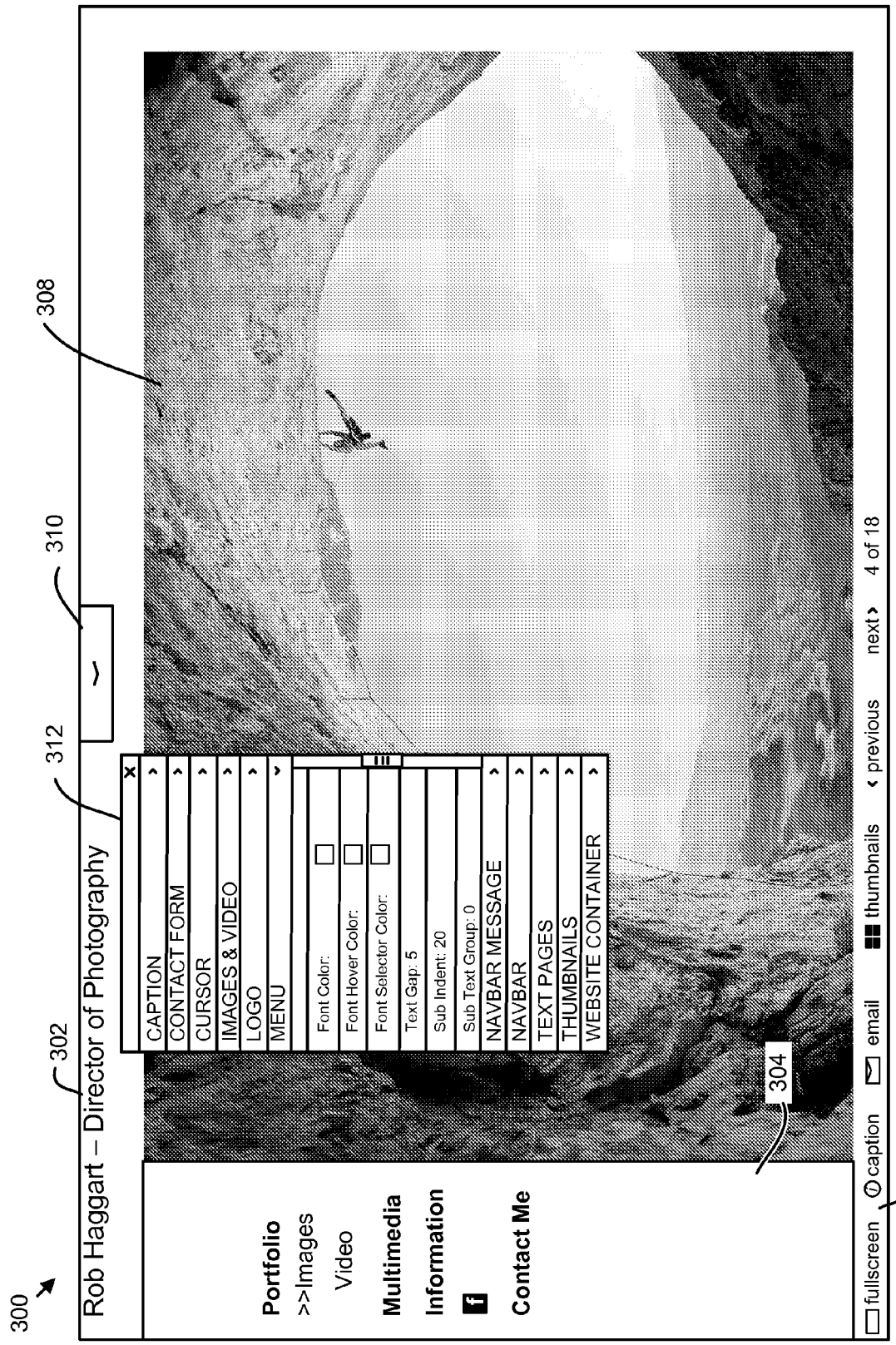

In FIG. 5, a "font color" setting adjusts the color of the fonts used for text menu items in the website menu 304. A "font hover color" setting adjusts the hover color a text menu item so that the color can change when a mouse cursor hovers over a text menu item of the website menu 304. A "font selector color" setting adjusts the font select color to control of a currently selected text menu item on the website menu 304. A "text gap" setting sets a gap between the menu items (text or icons) to space them out on the website menu 304. A "sub indent" setting sets an indent for menu items that are sub items of another menu item (e.g. "Images" is a sub item of "Portfolio") on the website menu 304. A "sub text gap" setting sets a gap between menu items that are sub items of another menu item.

Figure 6:
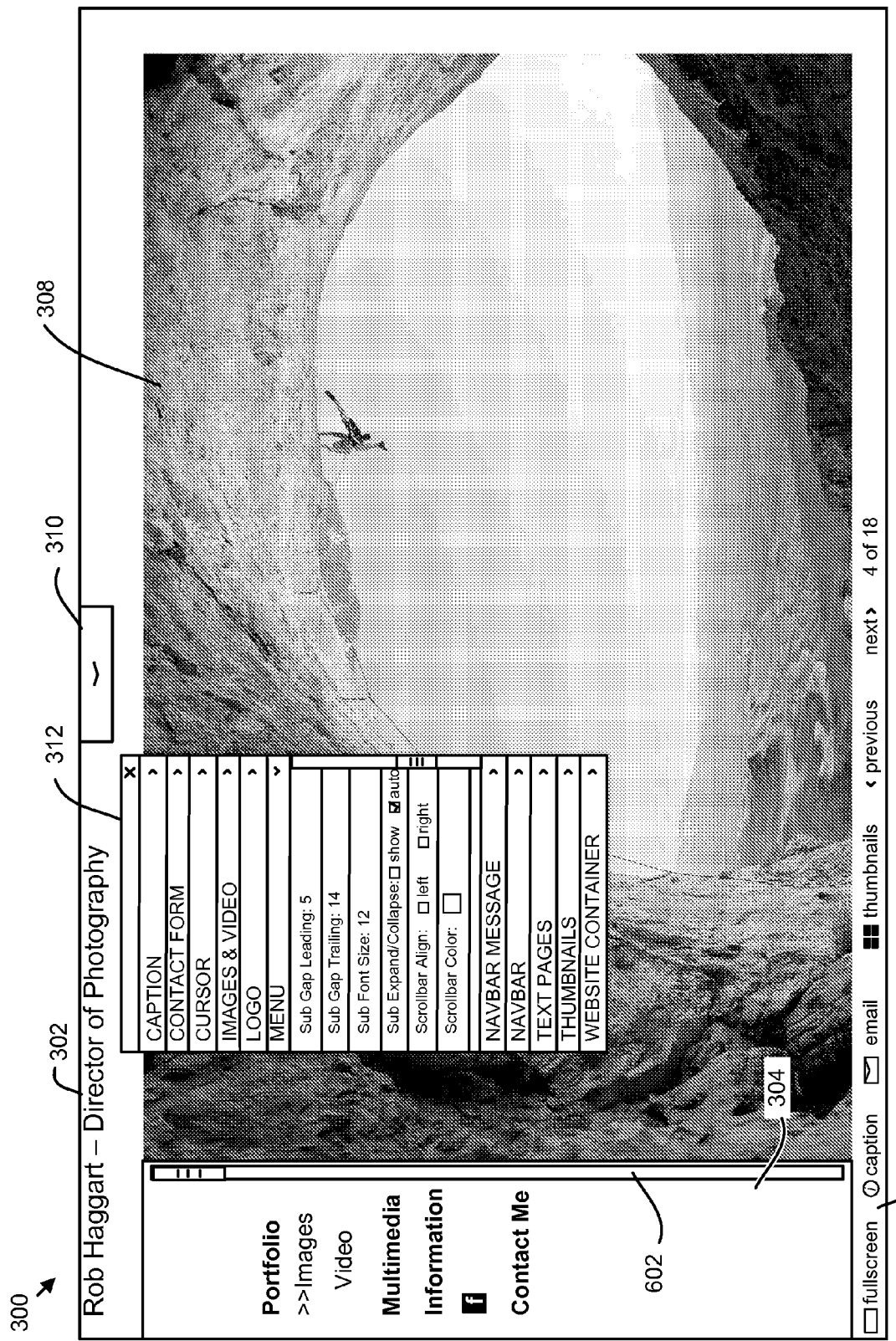

In FIG. 6, a "sub gap leading" setting sets a gap between a top sub menu item and the main menu item above it. A "sub gap trailing" setting sets a gap between a bottom sub menu item and a main menu item below it. A "sub font size" sets the font size for the text sub menu items of the website menu 304. A "sub expand/collapse" setting allows sub menu items to either show permanently (show) or only show when a main menu item is selected (auto). A "scrollbar align" setting sets the position of a scrollbar 602 that appears when the menu items are longer than the website menu 304. A "scrollbar color" setting adjusts the color of the scrollbar 602.

Figure 7:
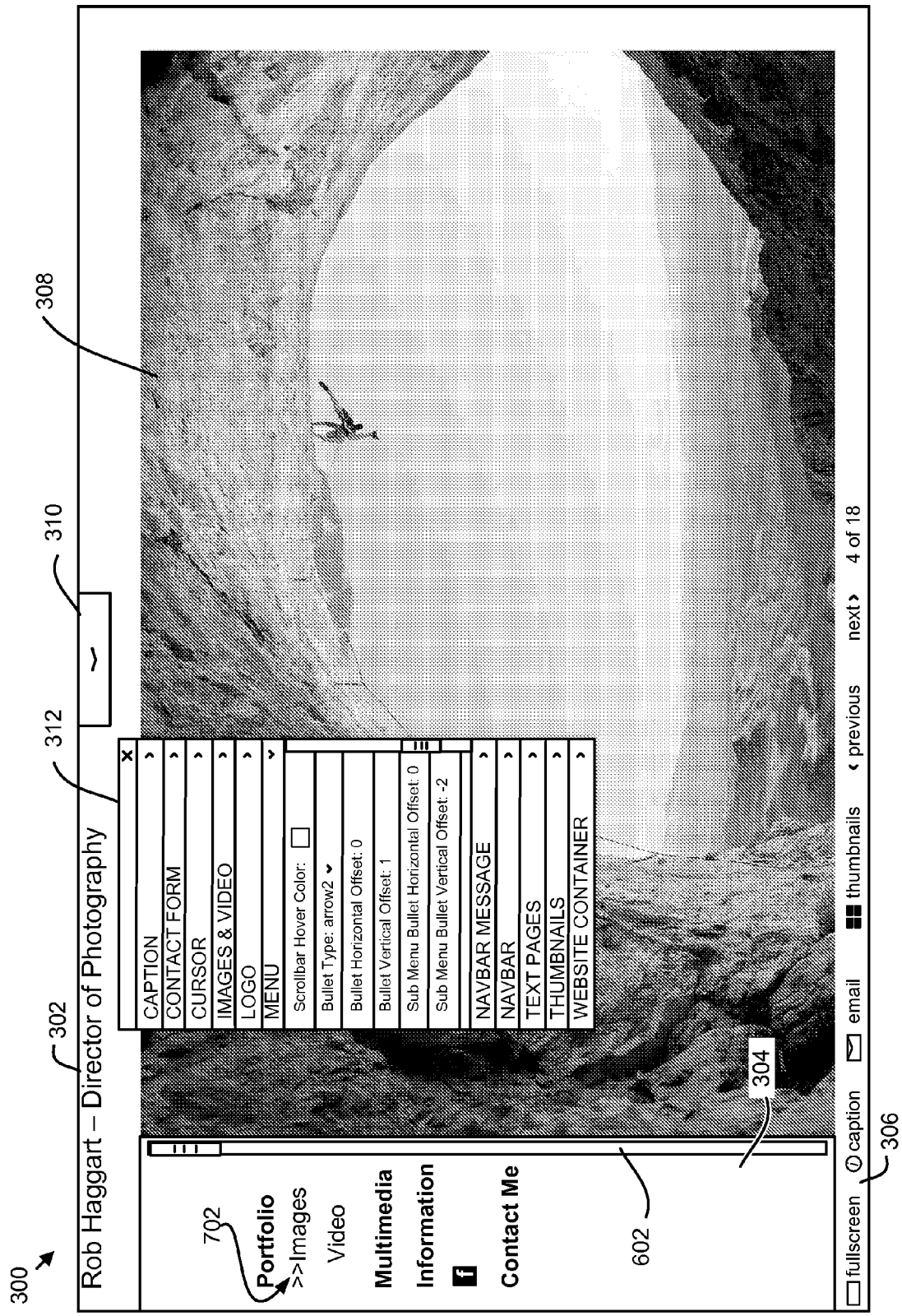

In FIG. 7, a "scrollbar hover color" adjusts the hover color of the scrollbar 602 so that it can change color when a mouse cursor is hovering over it. A "bullet type" setting sets the bullet type 702 that appears next to menu items to indicate when a cursor is hovering over them or when the menu item has been selected. A "bullet horizontal offset" setting adjusts the horizontal offset of the bullet so it can be aligned horizontally in relation to a menu item. A "bullet vertical offset" setting adjusts the vertical offset of the bullet so it can be aligned horizontally with a menu item. A "sub menu bullet horizontal offset" setting adjusts the horizontal offset of the bullet so it can be aligned horizontally with a sub menu item. A "sub menu bullet vertical offset" setting adjusts the vertical offset of the bullet so it can be aligned vertically with the sub menu item.

Figure 8:
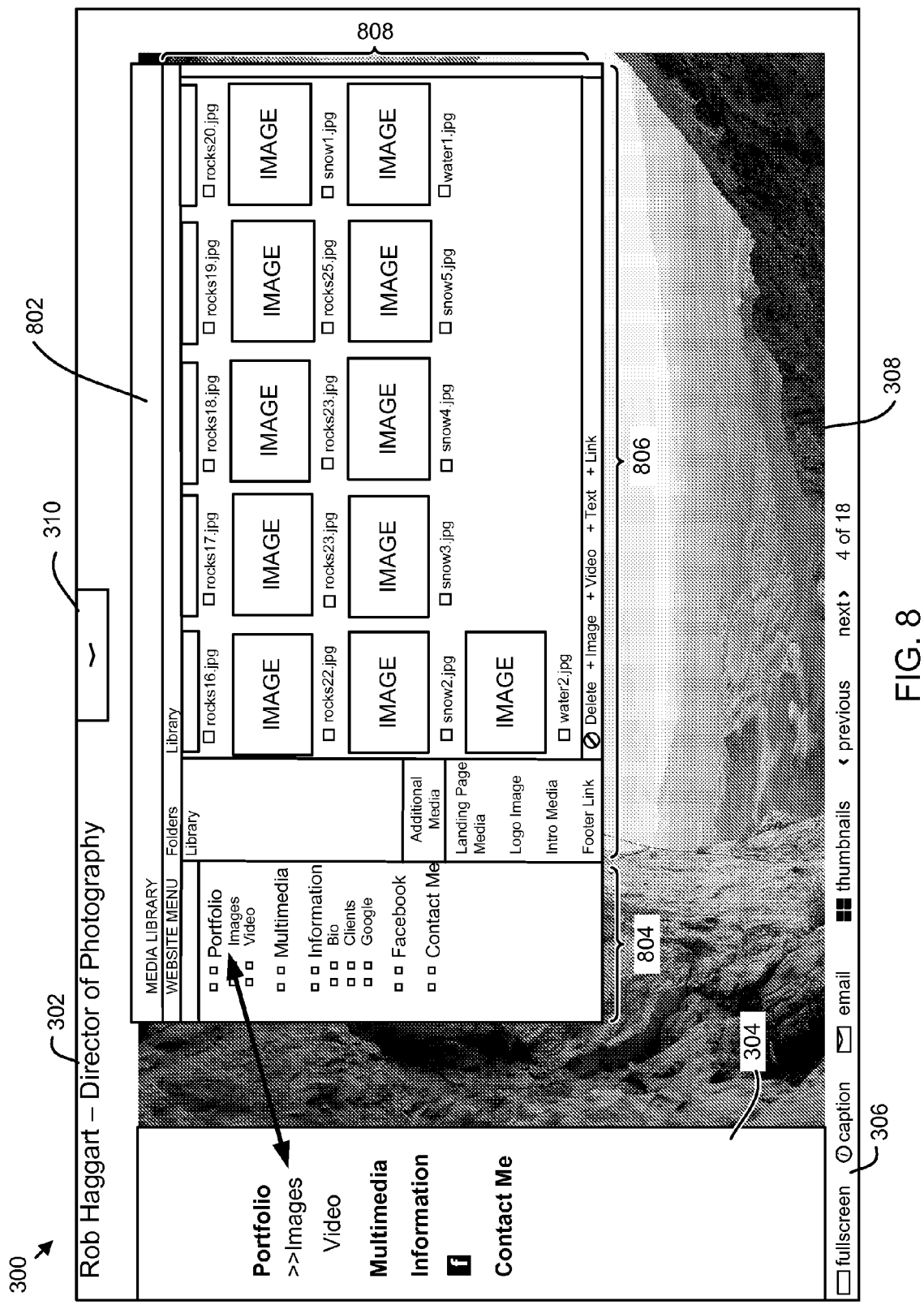
FIGS. 8, 9, 10, 11, 12, 13, 14, and 15 graphically represent screenshots illustrating a website and a media library panel of an editor interface consistent with embodiments disclosed herein.

Turning now to FIGS. 8, 9, 10, 11, 12, 13, 14, and 15 one embodiment of a media library panel 802 is illustrated. FIG. 8 is a screenshot of the website 300 of FIGS. 3, 4, 5, 6, and 7 with a media library panel 802 displayed. The media library panel 802 includes a simulated website menu 804 and a content management interface 806.

The simulated website menu 804 simulates one or more menu items and a layout of the website menu 304. For example, the simulated website menu 804 includes a simulated menu item "Images" that corresponds to the "Images" menu item of the website menu 304. Similar additional simulated menu items are also included corresponding to other menu items of the website men 304.

The simulated website menu 804 simulates the titles, order, and hierarchy of menu items of the website menu 304. For example, some of the menu items have the same title. Similarly, the order and hierarchy of a simulated menu item in the simulated website menu 804 is similar to the hierarch of a corresponding menu item in the website menu 304. According to one embodiment, even low hierarchy menu items are shown in the simulated website menu 804 so that they can be edited. For example, the "Bio", "Clients", and "Google"® menu items under the "Information" menu item are hidden in the website menu 304 but not in the simulated website menu 804.

Figure 9:
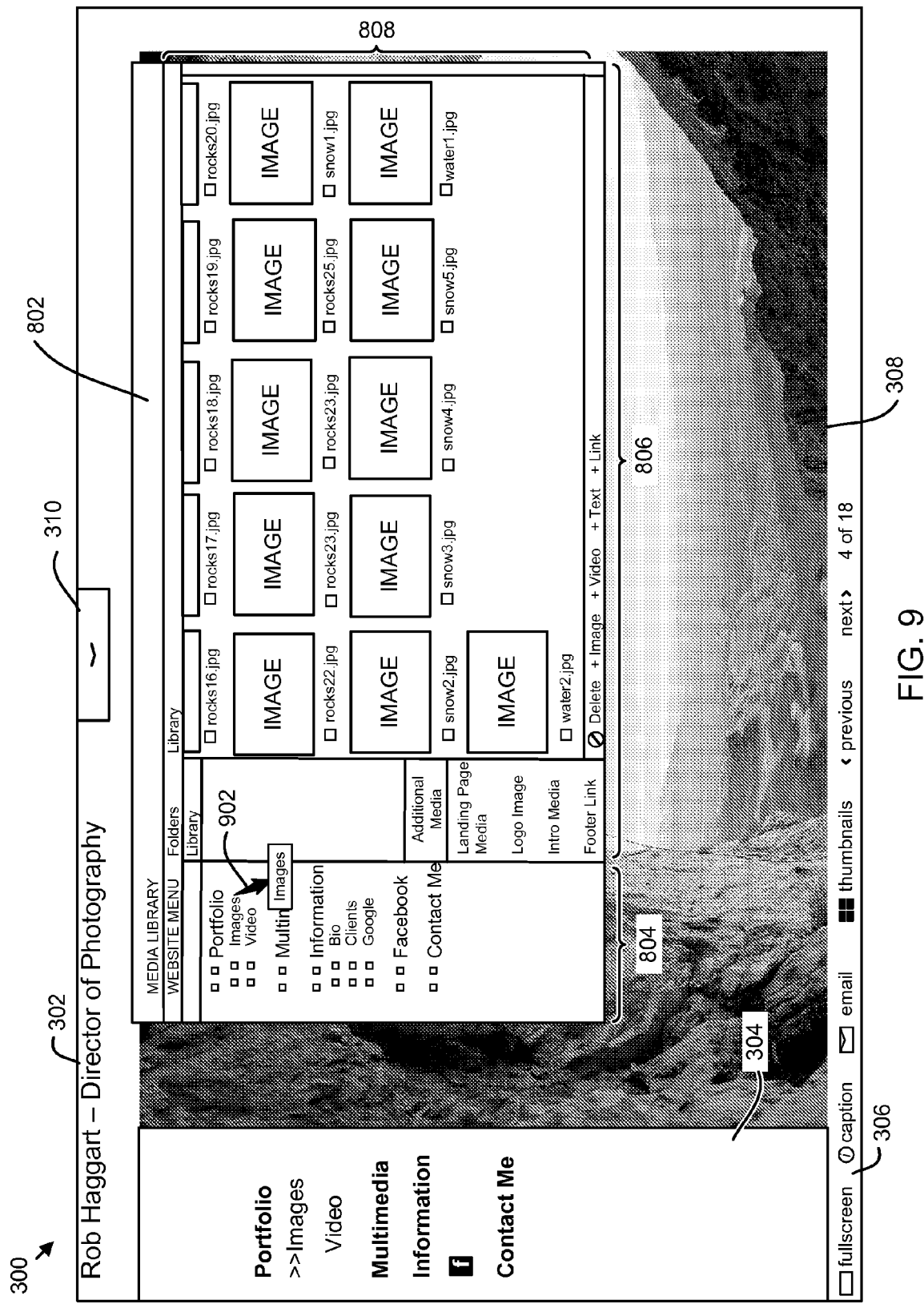

In one embodiment the website editor 104 allows a user to make changes to the simulated website menu 804 and thereby modify the website menu 304. For example, a user may be able to, using an input device, drag and drop a simulated menu item to reposition the simulated menu item in relation to other simulated menu items. In one embodiment, the user can drag a first menu item on top of a second menu item to add the first menu item as a sub item of the second menu item. Arrow 902 of FIG. 9 illustrates dragging of the "Images" simulated menu item to another position within the simulated menu 804. In response to an edit of the simulated website menu, the website editor 104 may update the website 300 in real time so that the website menu 304 includes menu items with the same order as corresponding simulated menu items of the simulated website menu 804. Similarly, a user may be able to edit the text of the menu items in the simulated website menu 804 and see the corresponding changes in the website menu 304.

According to one embodiment, the menu section of the website design panel 312 (see FIGS. 3 through 7) and the simulated website menu 804 are part of a menu design interface that allows a user to modify the website menu 304. The menu design interface may allow the a user to add, remove, and/or modify a menu item of the website menu 304. The website editor 104 may allow a user to graphically manipulate the simulated website menu 804. In one embodiment, the menu design interface allows a user to drag and drop a simulated menu item in the simulated website menu 804 to position, reorder, or remove a corresponding menu item in the website menu 304. The website editor 104 may allow a user to drag and drop a media item to the simulated website menu to add the media item to a webpage corresponding to the simulated menu item, such as the web page corresponding to a menu item of the website menu 304.

The content management interface 806 allows a user to manage content available for inclusion in the website 300 or for managing content on various pages of the website. In one embodiment, the content management interface 806 displays content that corresponds to a selected folder or a selected simulated menu item in a content window 808. For example, if a user selects the "Images" simulated menu item or the "Library" folder, the content window 808 may display the content that is in the corresponding folder or webpage. A user may be able to add, delete, or modify content that is displayed in the content window 808. For example, a user may be able to select one of the content items displayed in the content window 808 and rename or delete the content item.

Figure 10:
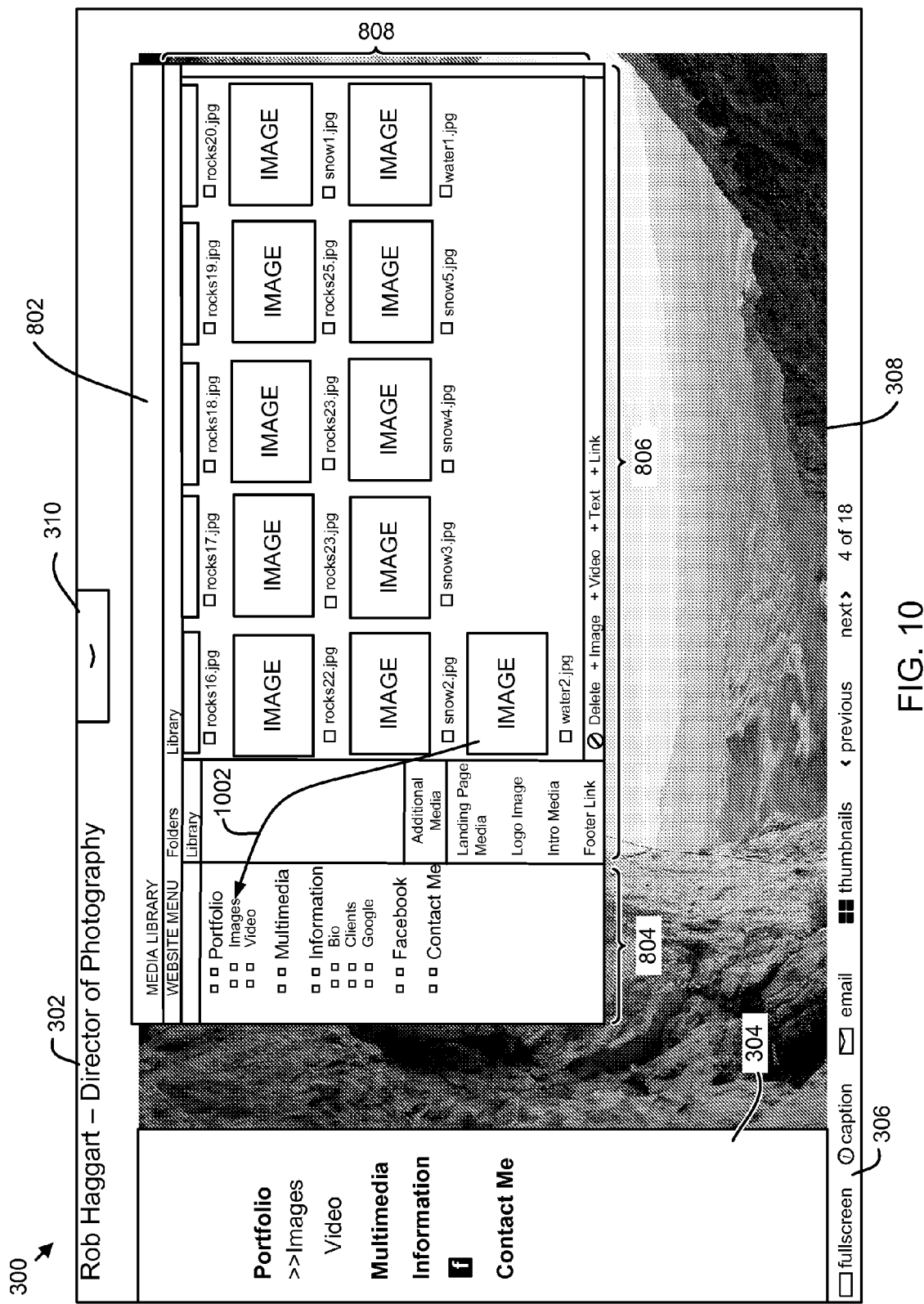
Figure 11:
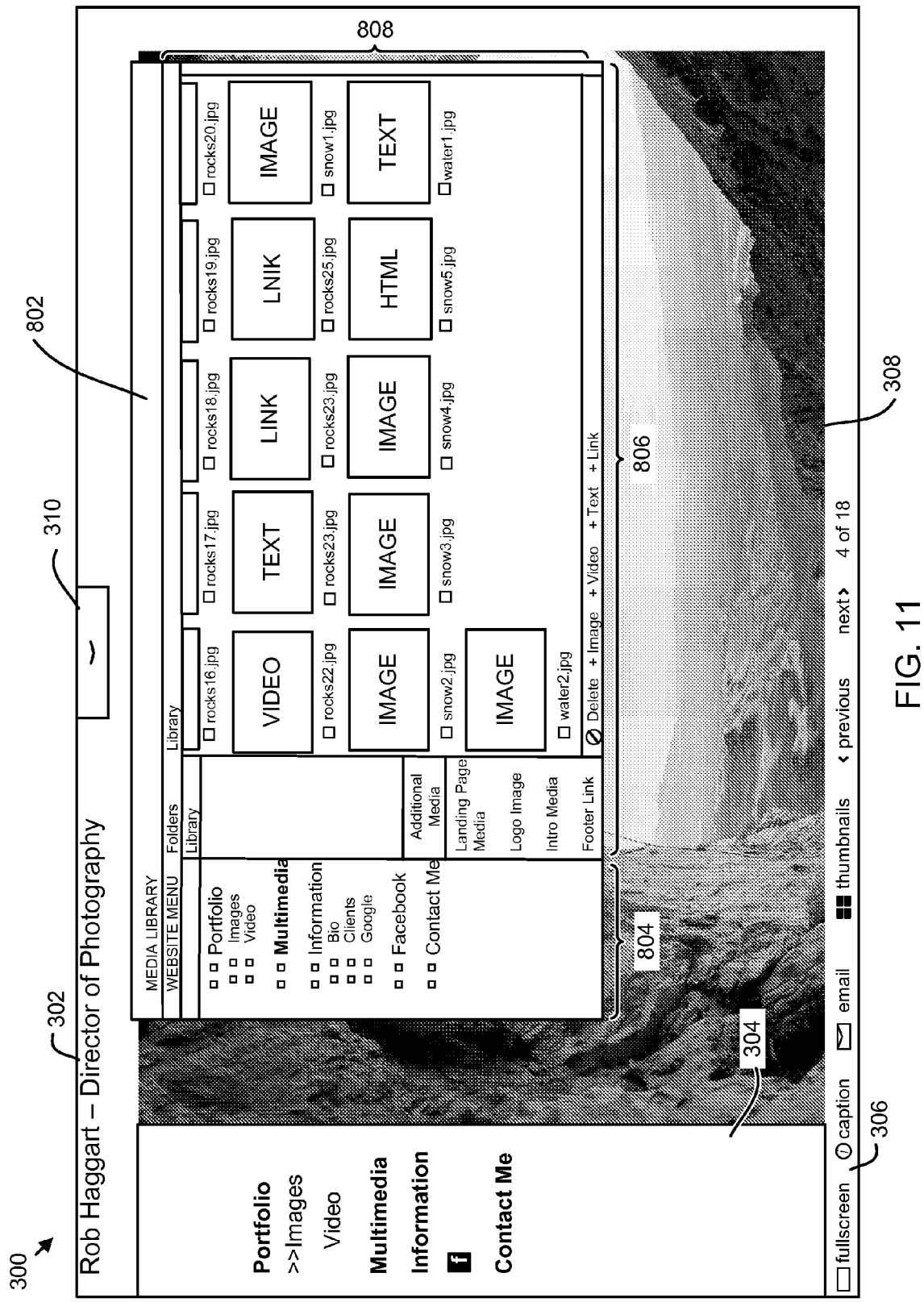

In one embodiment, a user may add a content item to the website 300 by dragging a content item from the content window 808 to a simulated menu item in the simulated website menu 804. For example, a user may be able to select a folder where content is stored to display content in that folder and then drag a content item from the content window 808 to a simulated menu item. Arrow 1002 of FIG. 10 illustrates how a user may drag a content item from the content window 808 on top of the "Video" simulated menu item to add the content item to a page corresponding to the "Video" menu item of the website menu 304. FIG. 11 illustrates that multiple types of media can be added to the same menu item. Specifically, the "Multimedia" simulated menu item is shown selected. The content items in the content window 808 are shown having video, text, HTML, link, and image content types included on the corresponding Multimedia page.

Figure 12:
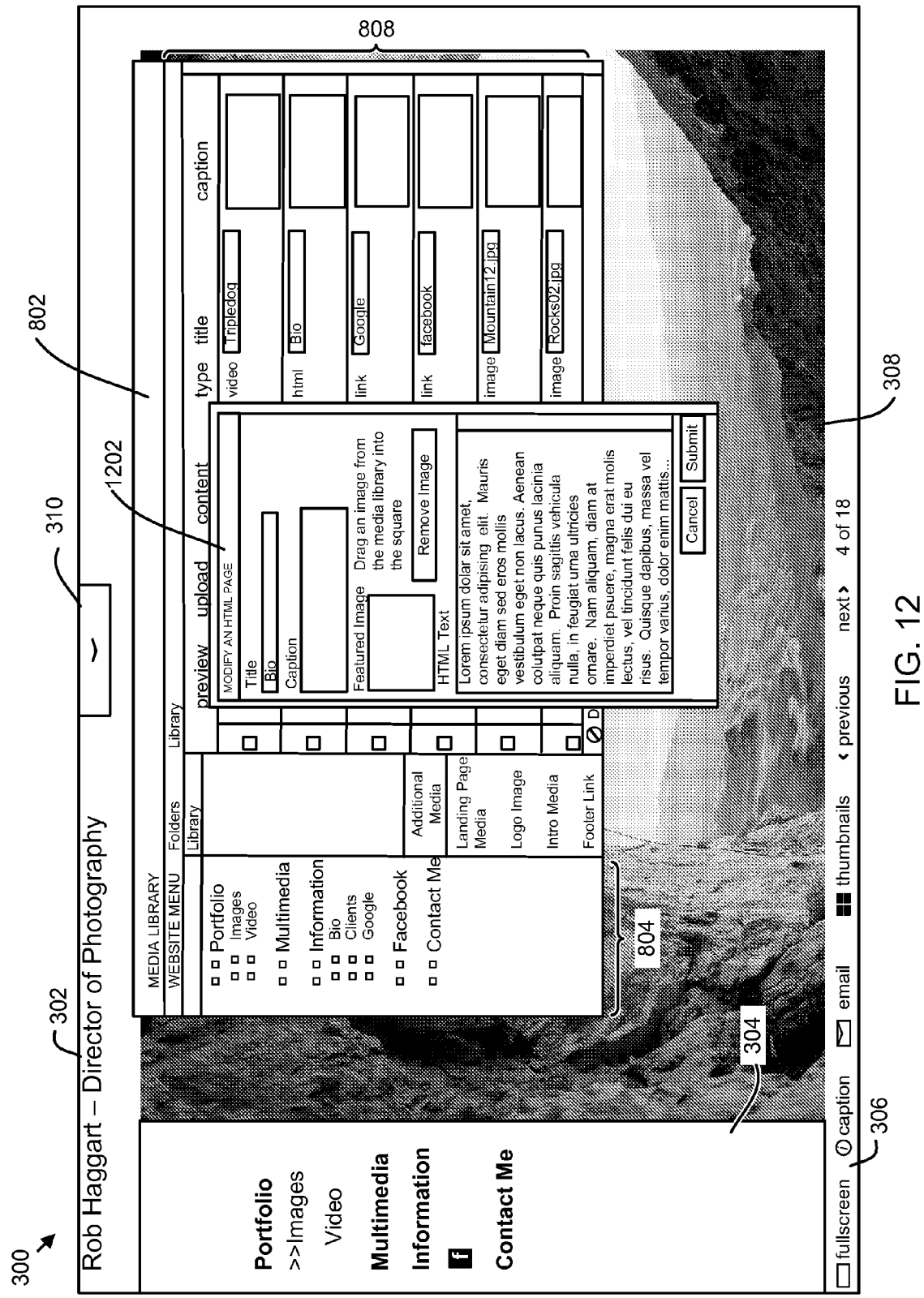

FIG. 12 illustrates an HTML modification panel 1202. A user may be able to display the HTML modification panel 1202 by selecting an HTML content item displayed within the content window 808 and selecting an option to edit the HTML content. The HTML modification panel 1202 may be displayed to allow a user to modify the HTML page. For example, a user can provide a title, caption, featured image, and HTML text for the selected HTML or text content.

Figure 13:
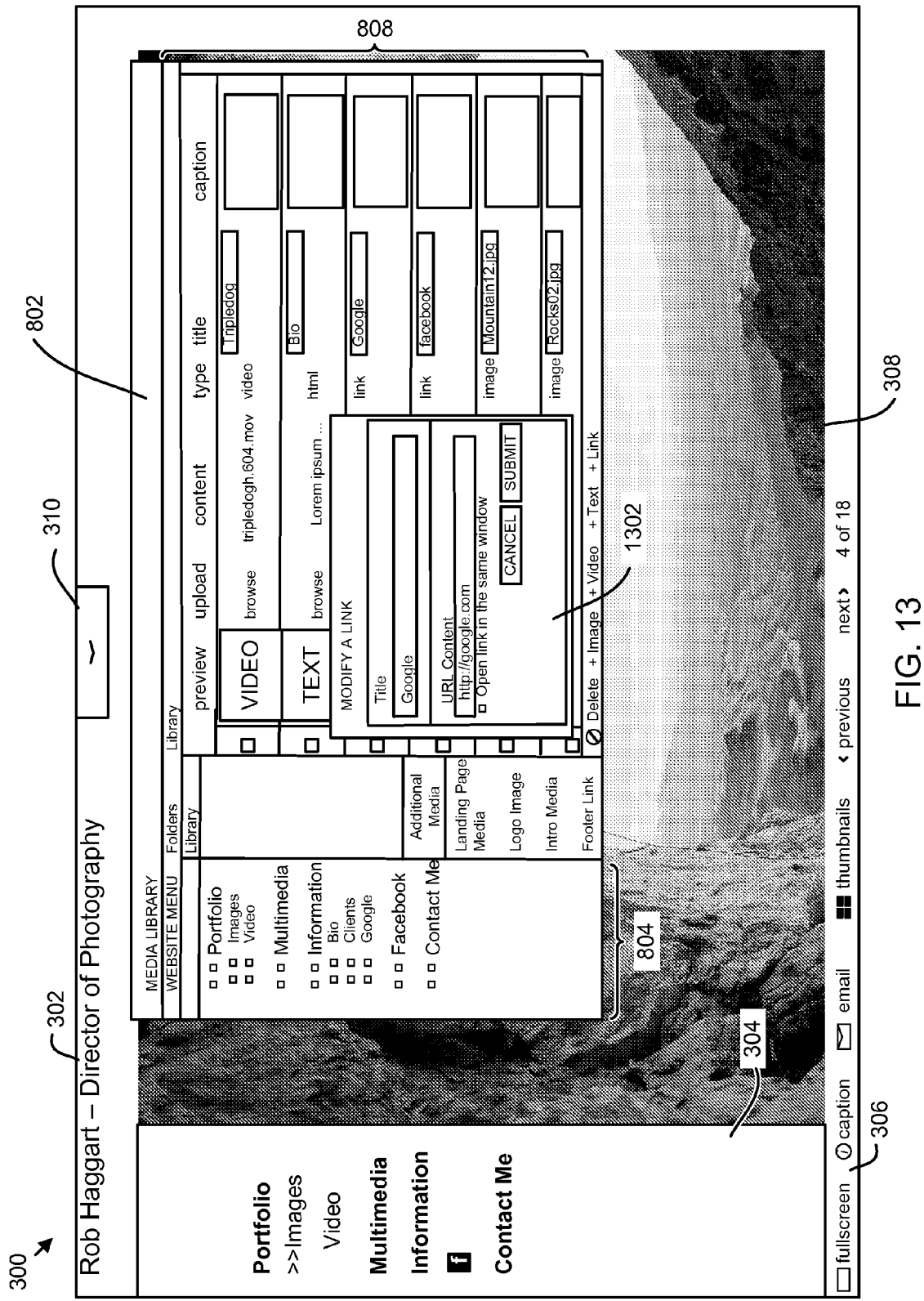

FIG. 13 illustrates a link modification panel 1302. A user may be able to display the link modification panel 1302 by selecting a link content item displayed within the content window 808 and selecting an option to edit the link content. The link modification panel 1302 may be displayed to allow a user to modify the link information. For example, a user may be able to enter or modify a link title and/or a link URL.

Figure 14:
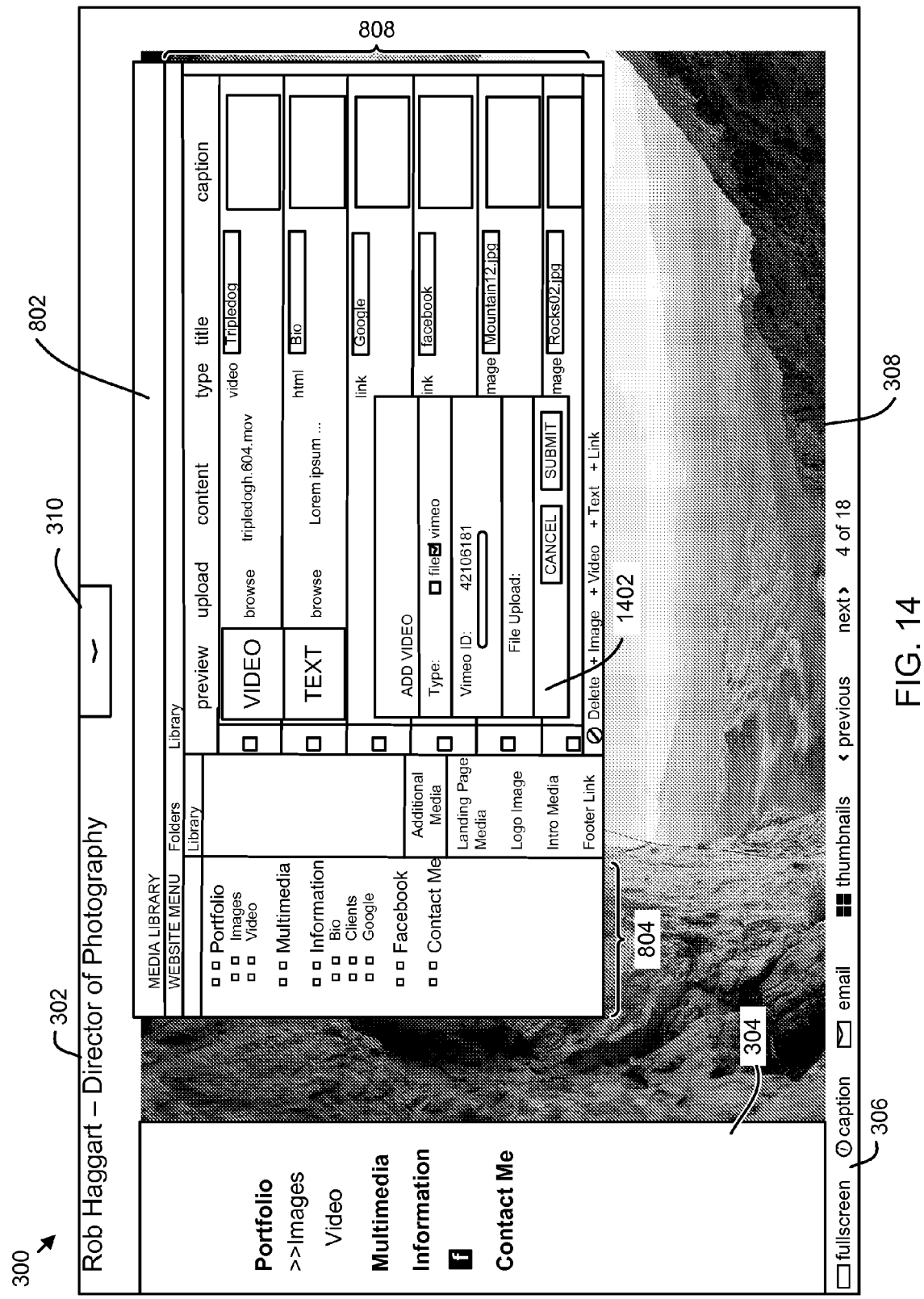

FIG. 14 illustrates a video addition panel 1402. A user may be able to select an "+Video" option (add video option) to add a video file or link to the "Library" folder or directly to a webpage. According to one embodiment, each time content is added to the website it is automatically added to the "Library" folder. The video addition panel 1402 may be displayed to allow a user to specify a file location or a web location for video content to be included in a content library or on the website 300. For example, the user may be able to specify a video file or URL to be added to a folder or webpage.

Figure 15:
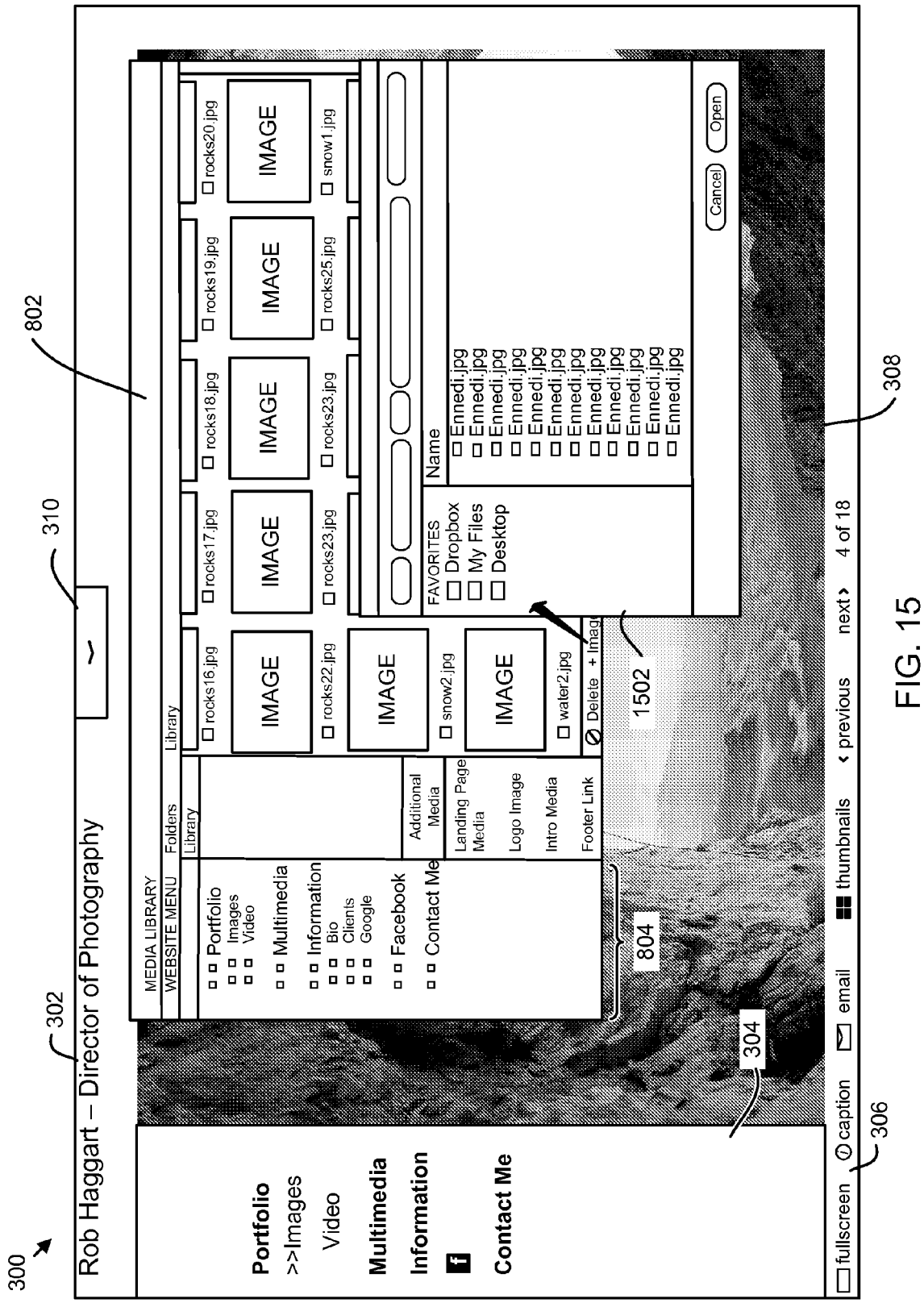

FIG. 15 illustrates an image addition panel 1502. A user may be able to select an "+Image" option (add image option) to add an image file or link. The image addition panel 1502 may be displayed to allow a user to specify a file location or a web location for image content to be included in a content library or on the website 300.

Figure 16:
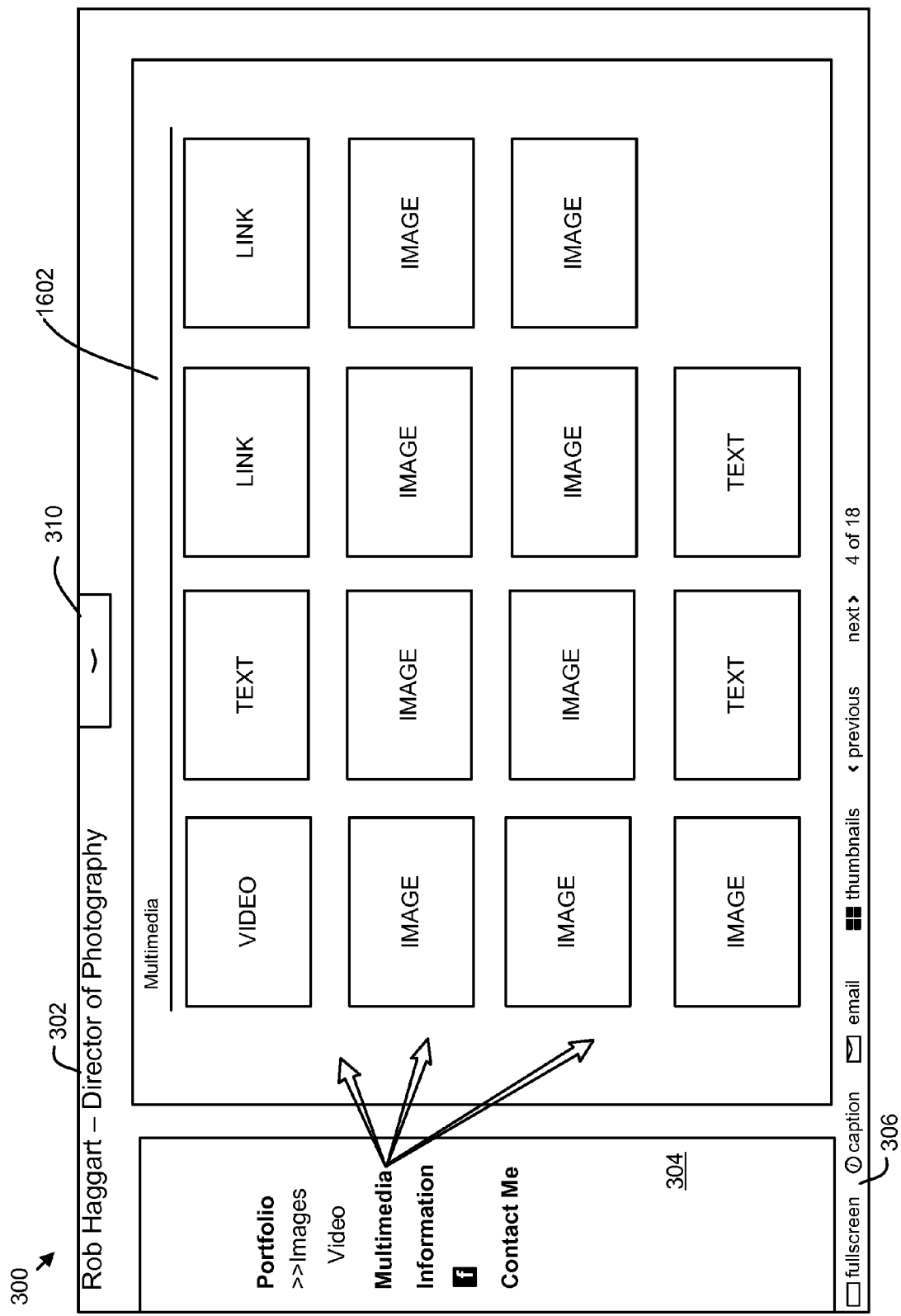
FIG. 16 graphically represents a screenshot illustrating a media gallery webpage consistent with embodiments disclosed herein.

FIG. 16 illustrates one embodiment of a media gallery webpage 1602 within the website 300. According to one embodiment, the media gallery webpage 1602 corresponds to the "Multimedia" menu item of the website menu 304. The gallery webpage 1602 includes a variety of images types, including video, text, link, and image content types. A media gallery webpage 1602 may be created, removed, or modified by adding a corresponding menu item to the simulated website menu 804. In one embodiment, a media gallery webpage 1602 is created by adding one or more media content items to the webpage.

The media gallery webpage 1602 is shown in a thumbnail view in FIG. 16. For example, the thumbnail view may be displayed by a user selecting the thumbnail option from the navigation bar 306. The media gallery webpage 1602 may also have one or more alternate views for displaying one or more content items. For example, in response to selection of a thumbnail, such as a mouse click, the media gallery webpage 1602 may change to show the selected media content filling the webpage area. For example, if the selected thumbnail corresponds to an image, the image may be displayed as depicted in FIG. 3, with the image filling a large portion of the webpage but not obstructing the website menu 304. If a user selects the fullscreen option from the navigation bar 306, the image may be expanded to fill the whole screen of a device. For example, the website menu 304, navigation bar 306, and/or other portions of an on screen interface may not be displayed because the image fills the whole screen.

In one embodiment, when content is displayed as a full webpage, as in FIG. 3, graphical transitions may be used to cycle from one content item to the next. For example, a slide in, fade in, or other transition effect may be used to transition from one image to the next, or from one content item to the next. A user may be able to transition from one image to the next by clicking on the image. For example, clicking near the left side of the image may transition to a previous content item and clicking near a right side of the image may transition to a next content item.

Figure 17:
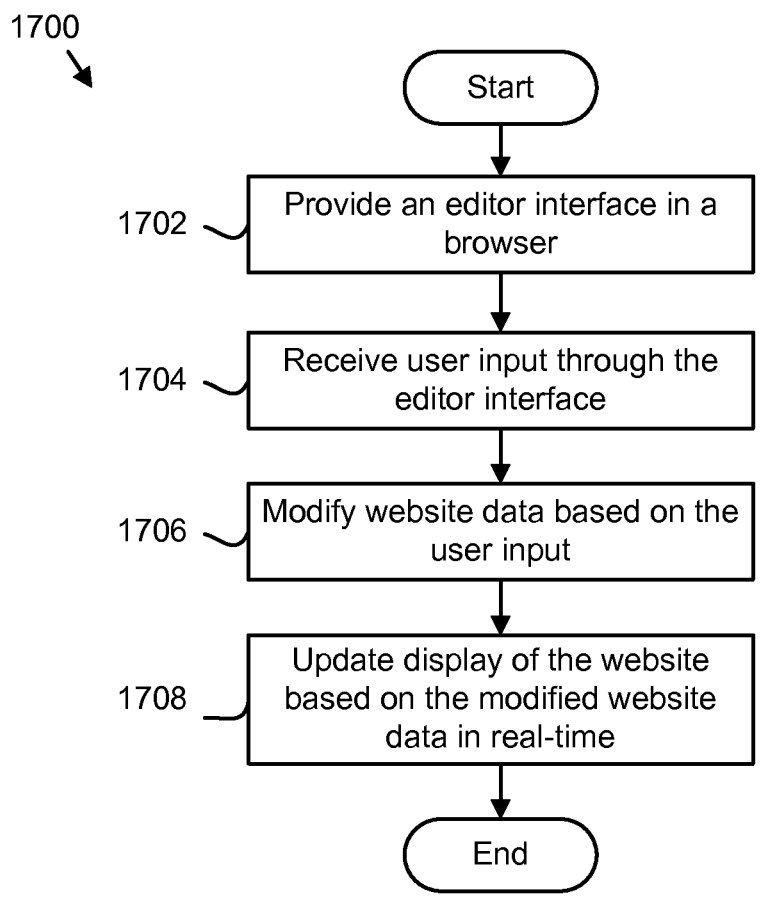
FIG. 17 is a schematic flow chart diagram of a method for editing a website consistent with embodiments disclosed herein.

FIG. 17 is a schematic flow chart diagram of a method 1700 for editing a website. In one embodiment, the method 1700 is performed by a website editor 104.

The method begins and the editor display component 202 provides 1702 an editor interface in a browser of a client 108. For example, the editor display component 202 may provide 1702 an editor interface comprising one or more of the editor control object 310, the design panel 312 or any other panels or interfaces as discussed in relation to FIGS. 3, 4, 5, 6, 7, 8, 9, 10, 11, 12, 13, 14, 15, and 16. The editor display component 202 may provide 1702 the editor interface remotely from a server 102 or may provide the editor interface from the client 108. In one embodiment, the editor display component 202 displays the editor interface simultaneously with a website to be edited within the browser.

The website modification component 204 receives 1704 user input entered through the editor interface. The website modification component 204 may receive 1704 the user input entered by a user from the editor display component 202 or from any other component.

The website modification component 204 modifies 1706 website data based on the user input. For example, the website modification component 204 may receive settings input by a user and modify 1706 website code based on the received settings. In one embodiment, the website modification component 204 may modify 1706 a temporary copy of the website data, such as a copy of website data local to a client 108. In another embodiment, the website modification component 204 may modify 1706 a live version of the website data, such that user's at other clients 108 may be able to view the changes in a live manner. The website modification component 204 may modify 1706 the website data by directly modifying the data or by sending messages to another component, server 102, database 106, or other device to modify the data.

The website display component 206 updates 1708 display of the website based on the modified website data. The website display component 206 may update 1708 display of the website by updating 1706 data used by a browser to display the website. The website display component 206 may update 1708 display of the website by causing a client 108 to reload website data which has been modified 1706 by the website modification component 204. In one embodiment, that website display component 206 updates 1708 display of the website in real-time in response to receiving user input through the editor interface. For example, the time between the input of data by a user in the editor interface and the updating 1708 of display of the website may be less than a required time period.

Some of the components that can be used with embodiments disclosed herein are already available, such as general-purpose computers, mobile phones, computer programming tools and techniques, digital storage media, and communications networks. A computing device, such as a laptop, tablet computer, desktop computer, server, Smartphone, or the like, may include a processor, such as a microprocessor, microcontroller, logic circuitry, or the like. The processor may include a special purpose processing device such as an ASIC, PAL, PLA, PLD, FPGA, or other customized or programmable device. The computing device may also include a computer-readable storage device such as non-volatile memory, static RAM, dynamic RAM, ROM, CD-ROM, disk, tape, magnetic, optical, flash memory, or other computer-readable storage medium.

Various aspects of certain embodiments may be implemented using hardware, software, firmware, or a combination thereof. As used herein, a software component may include any type of computer instruction or computer executable code located within or on a non-transitory computer-readable storage medium. A software component may, for instance, comprise one or more physical or logical blocks of computer instructions, which may be organized as a routine, program, object, component, data structure, etc., that performs one or more tasks or implements particular abstract data types.

In certain embodiments, a particular software component may comprise disparate instructions stored in different locations of a computer-readable storage medium, which together implement the described functionality of the component. Indeed, a component may comprise a single instruction or many instructions, and may be distributed over several different code segments, among different programs, and across several computer-readable storage media. Some embodiments may be practiced in a distributed computing environment where tasks are performed by a remote processing device linked through a communications network.

The systems and methods disclosed herein are not inherently related to any particular computer or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network.

Software embodiments may be implemented as a computer program product that comprises a non-transitory storage medium configured to store computer programs and instructions that, when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a Bernoulli drive, a magnetic disk, a punch card, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing the processes, apparatuses, and system described herein. Accordingly, the present embodiments are to be considered illustrative and not restrictive, and the invention is not to be limited to the details given herein, but may be modified within the scope and equivalents of the appended claims.

As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus.

It will be understood by those having skill in the art that many changes may be made to the details of the above-described embodiments without departing from the underlying principles of the invention. The scope of the present invention should, therefore, be determined only by the following claims.

The invention claimed is:

1. A website editor comprising:
a processor and a computer readable storage medium comprising program code executable by the processor, the program code comprising:
an editor display component configured to display an editor interface for receiving user input for editing a website, the editor interface displayed within a browser simultaneously with the website and comprising:
a menu design interface, the menu design interface for allowing a user to modify media content of the website and comprising a simulated website menu representing a website menu;
wherein the menu design interface allows a user to drag and drop media content from a media library to a simulated menu item in the simulated website menu to position the media content in a webpage corresponding to the simulated menu item;
a website modification component configured to update website data corresponding to the website based on the user input received through the editor interface; and
a website display component configured to automatically update display of the website based on the updated website data, wherein the website display component updates display of the website in real-time in response to receiving the user input.

2. The website editor of claim 1, wherein the editor display component and the website data are received from one or more remote web servers.

3. The website editor of claim 2, wherein the editor display component comprises code executable within a browser of a client device.

4. The website editor of claim 1, further comprising an authorization component configured to authorize a user, and wherein the editor display component displays the editor interface in response to authorization of the user.

5. The website editor of claim 1, wherein the editor display component displays an editor control object selectable to expand the editor interface.

6. The website editor of claim 1, wherein the editor display component displays the editor interface at least partially overlapping the website.

7. The website editor of claim 1, wherein the menu design interface allows the user to modify a website menu.

8. The website editor of claim 7, wherein the menu design interface provides options allowing a user to add, remove, and modify a menu item of the website menu.

9. The website editor of claim 7, wherein the website display component updates display of the website menu in real-time in response to receiving user input indicating modification of the website menu.

10. The website editor of claim 7, wherein the website menu comprises a menu item, the menu item comprising one or more of a link to a webpage of the website, an external link, and a link for performing an operation.

11. The website editor of claim 10, wherein the link to a webpage of the website comprises a link to a gallery webpage.

12. The website editor of claim 1, wherein the menu design interface allows a user to drag and drop a simulated menu item in the simulated website menu to position a corresponding menu item in the website menu.

13. The website editor of claim 1, wherein the menu design interface allows a user to drag and drop a simulated menu item in the simulated website menu to reorder a corresponding menu item and one or more additional menu items of the website menu.

14. The website editor of claim 1, wherein the menu design interface allows a user to drag and drop a simulated menu item in the website menu to remove a corresponding menu item from the website menu.

15. The website editor of claim 1, wherein the menu design interface allows a user to drag and drop a media item to the simulated website menu to add the media item to the website.

16. The website editor of claim 15, wherein the menu design interface allows a user to drag the media item to a simulated menu item to add the media item to a webpage corresponding to the simulated menu item.

17. The website editor of claim 1, wherein the editor display component displays an editor interface comprising a media library interface.

18. The website editor of claim 17, wherein the media library interface displays media items available for inclusion on the website.

19. The website editor of claim 18, wherein the editor interface allows a user to drag and drop a media item to add the media item to the website.

20. The website editor of claim 17, wherein the editor interface allows creation of a gallery webpage where one or more media items may be displayed.

21. The website editor of claim 20, wherein the editor interface allows addition of media items having different media types to the gallery webpage.

22. The website editor of claim 20, wherein the gallery webpage comprises a page for displaying media content.

23. The website editor of claim 22, wherein the gallery webpage comprises an option for one or more alternate views of the media content comprising one or more of a thumbnail view and a page view.

24. The website editor of claim 22, wherein the gallery webpage provides a graphical transition from one media item to a next media item.

25. The website editor of claim 1, wherein editor data corresponding to one or more of the editor display component, the website modification component, and the website display component is received by and executed in a browser.

26. A computer implemented method for website editing, the method comprising:
providing an editor interface in a browser simultaneous with a website, the editor interface for editing the website, the editor interface comprising:
a menu design interface, the menu design interface for allowing a user to modify media content of the website and comprising a simulated website menu representing a website menu;
wherein the menu design interface allows a user to drag and drop media content from a media library to a simulated menu item in the simulated website menu to position the media content in a webpage corresponding to the simulated menu item;
receiving user input through the editor interface;
modifying website data corresponding to the website based on the user input; and
updating display of the website within the browser based on the modified website data, wherein the website is updated in real-time based on the user input received via the editor interface.

27. The method of claim 26, further comprising authorizing a user, wherein the editor interface is provided in response to authorization of the user.

28. The method of claim 26, further comprising displaying an editor control object selectable to expand the editor interface.

29. The method of claim 26, wherein providing the editor interface comprises displaying the editor interface at least partially overlapping the website.

30. The method of claim 26, wherein the editor interface comprises a panel with one or more graphical elements for modifying website data for the website.

31. The method of claim 26, wherein the editor interface is freely positionable in relation to the website.

32. The method of claim 31, the method comprising allowing a user to use an input device to drag the editor interface from a first location to a second location.

33. The method of claim 26, wherein modifying the website data comprises modifying a local copy of the website data.

34. The method of claim 26, wherein modifying the website data comprises sending a message comprising the user input to update the website data on a website data host.

35. The method of claim 26, wherein modifying the website data comprises sending a message comprising updated website data corresponding to the user input to update the website data on a website host.

36. The method of claim 26, wherein updating the website data comprises updating the website wherein at least a portion of the website is covered by a portion of the editor interface.

37. The method of claim 26, wherein providing the editor interface comprises providing the editor interface and the website within a same browser page.

38. The method of claim 26, further comprising receiving the website data corresponding to the website over a network.

39. A system for hosting a website editor application, the system comprising a processor and a computer readable storage medium comprising program code executable by the processor, the program code comprising:

an editor display component configured to display an editor interface for receiving user input for editing a website, the editor interface configured for display within a browser simultaneously with the website, the editor display component comprising:

a menu design interface, the menu design interface for allowing a user to modify media content of the website and comprising a simulated website menu representing a website menu;

wherein the menu design interface allows a user to drag and drop media content from a media library to a simulated menu item in the simulated website menu to position the media content in a webpage corresponding to the simulated menu item;

a website modification component configured to update website data corresponding to the website based on the user input received through the editor interface, the website data defining the display and content of the website;

a website display component configured to automatically update display of the website based on the updated website data, wherein the website display component updates display of the website in real-time in response to receiving the user input; and a web hosting component configured to provide the editor display component to a browser of a client device over a network.

40. The system of claim 39, wherein the editor display component comprises code executable within a browser of a client device.

41. The system of claim 39, wherein the program code further comprises an authorization component configured to authorize a user, and wherein the editor display component displays the editor interface in response to authorization of the user.

42. The system of claim 39, wherein the editor display component displays an editor control object selectable to expand the editor interface.

43. The system of claim 39, wherein the editor display component displays the editor interface at least partially overlapping the website.

* * * * *